March 7, 1972 F. R. JOSLIN 3,647,674
ELECTRODE FOR SMALL HOLE ELECTRO-CHEMICAL DRILLING
Filed July 13, 1970
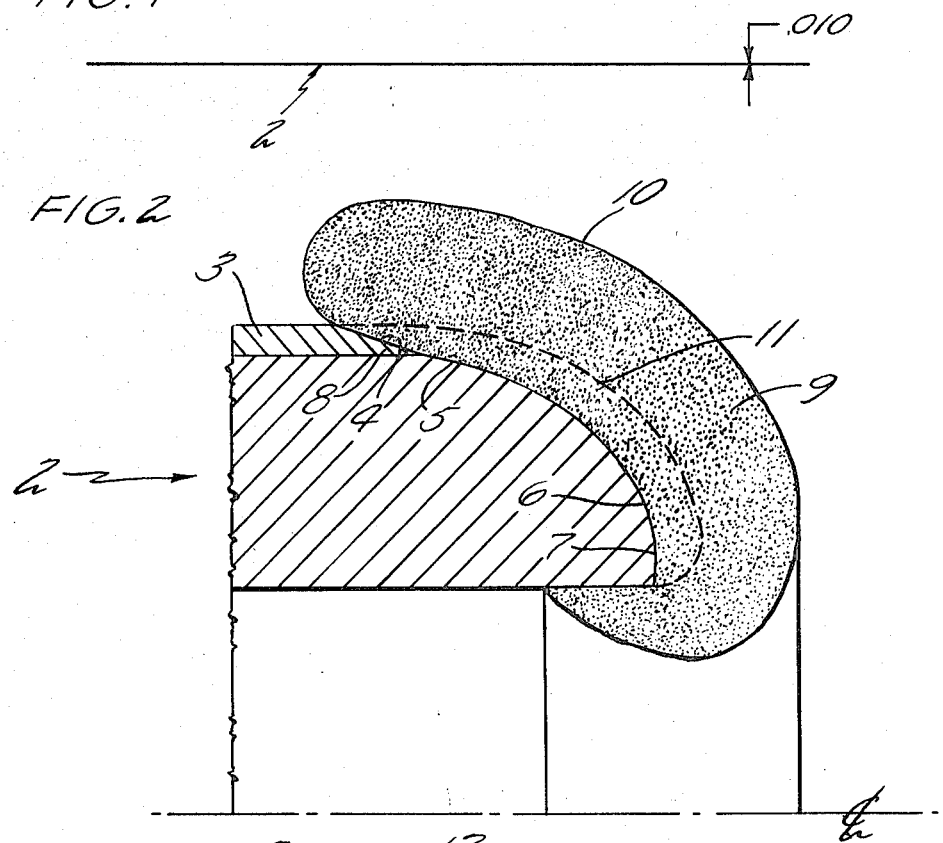
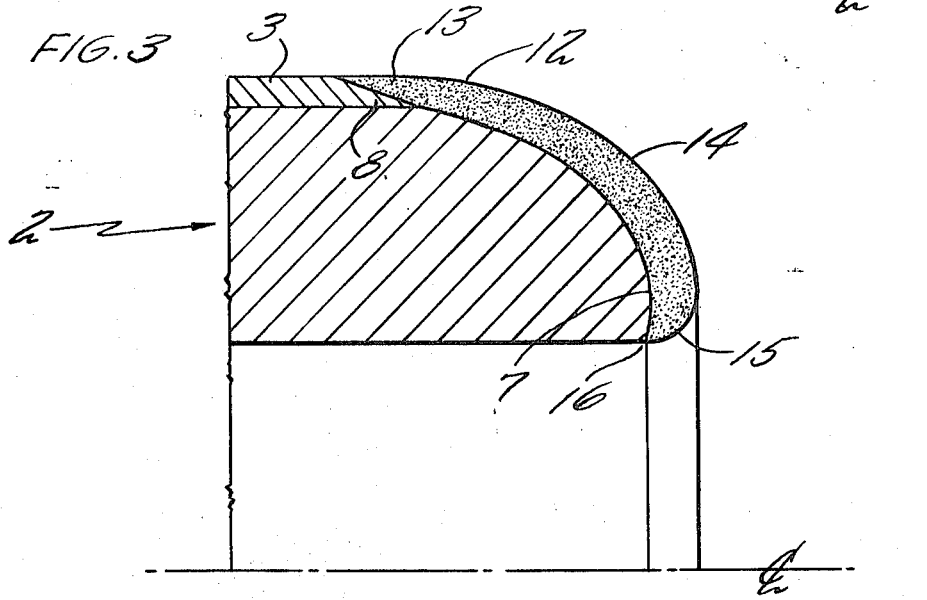
INVENTOR
FREDERICK R. JOSLIN
BY Charles A. Warren
ATTORNEY

United States Patent Office 3,647,674
Patented Mar. 7, 1972

3,647,674
ELECTRODE FOR SMALL HOLE ELECTRO-CHEMICAL DRILLING
Frederick R. Joslin, Lebanon, Conn., assignor to United Aircraft Corporation, East Hartford, Conn.
Filed July 13, 1970, Ser. No. 54,496
Int. Cl. B01k 3/04; C23b 5/74; B23p 1/00
U.S. Cl. 204—284                                    10 Claims

ABSTRACT OF THE DISCLOSURE

An electrode for electro-chemical drilling in which the dielectric on the outer surface of the tube is held in place at the working end of the electrode by an overlying metallic plating that covers the end surface of the tube.

BACKGROUND OF THE INVENTION

In drilling small diameter holes by electro-chemical machining, the diameter of the hole is limited by the dimension of the electrode which must have an internal diameter large enough for the necessary flow of electrolyte without severe restriction and an outside diameter such that a dielectric can be put on the outer surface of such a thickness and so arranged as to maintain its integrity during the use of the electrode. The overall diameter of the electrode with the dielectric thereon establishes the minimum size of the drilled hole since the finished hole must be enough larger than the electrode to permit the entry of the electrode in the hole as it is being formed and to provide for the escape of contaminated electrolyte between the electrode and the wall of the hole being drilled.

SUMMARY OF INVENTION

A principal feature of the invention is an electrode having a thin dielectric coating on the surface so arranged that it will remain in position during use of the electrode. Another feature is the forming of the working end of the electrode to be most effective in removal of material from the work piece and to retain its integrity for substantial period. Particularly this invention relates to small diameter electrodes for use in producing small holes.

According to the invention, a small diameter metallic tube has a thin dielectric coating applied to the outer surface. At the working end of the electrode, this dielectric and the adjacent tube wall are formed to a tapering surface thereby producing an obliquely positioned outer surface in this area of the tube and creating a tapering end on the dielectric material on the metallic tube. The end of the tube is then electro-plated with the metallic electro-plate also covering the thin tapering end of the dielectric to prevent it from lifting away from the metallic tube in operation. Before the electrode is used, the electro-plating is machined so that the electro-plate is the same diameter beyond the end of the dielectric as the outside diameter of the dielectric itself.

BRIEF DESCRIPTION OF THE DRAWINGS

FIG. 1 is an elevation of an electrode drawn substantially to full scale.

FIG. 2 is a greatly enlarged sectional view of the working end of the electrode partially completed.

FIG. 3 is a view similar to FIG. 2 of the completed electrode.

DETAILED DESCRIPTION OF THE INVENTION

Referring to FIG. 1, the electrode 2 is shown in full size. In the particular embodiment shown the electrode is intended for drilling holes that are about twelve to fifteen thousandths of an inch in diameter and the electrode itself in the embodiment shown is .010 inch in diameter. The electrode is a hollow metallic tube 2, in FIGS. 1, 2 and 3. The particular tube is a piece of full hard beryllium copper tubing with, for example, an outside diameter of .010 inch and an inside diameter of .005 inch. This tubing is coated on the outside surface with a special thin film of electrical insulation 3. The insulation used is a vapor phase polymerized thermoplastic for example a parylene and more particularly poly(monochloro-p-xylylene). One form of this material is produced by Union Carbide and is known as Parylene C. This material is applied to the outside of the tube in the form of an adherent coating of about, for example, .00035 inch in thickness.

After the dielectric coating has been applied, the working end of the electrode has a frustoconical surface 4 formed thereon on the coating 3 and an extension 5 of this frustoconical surface on the outer wall surface of the tube 2. These frustoconical surfaces blend with a curved surface 6 that extends from the frustoconical surface to the inner wall surface of the tube and preferably terminates in a substantially radial end surface 7. The effect of the frustoconical surface 4 is to form a tapering end 8 on the dielectric. Accordingly, the tapering end becomes a feather edge and blends with the frustoconical surface 5 on the tube itself. The surfaces 4, 5, 6 and 7 are preferably formed by a grinding operation.

A layer or coating 9 of conductive material is then plated on the end of the tube overlaying the end of the dielectric coating 3. In this case, the coating 9 is silver and is applied by electro-plating. This coating is built up to produce an enlarged end on the tube thereby providing a greater thickness of silver than is needed for the finished shape of the electrode. It will be apparent that the electro-plated material extends over the tapered portion of the dielectric and extends beyond the diameter of the outer surface of the dielectric as shown. The outer surface 10 of the silver coating extends generally in parallel relation to the end surface 6 of the tube 2 and is in general about .003 inch in thickness.

After the silver coating has been plated on the electrode, the coating is machined back to a line 11, FIG. 2, which represents the finished contour of the electrode when it is ready for use. The finished surface of the silver coating on the electrode is cylindrical as at 12, FIG. 3 adjacent to the dielectric and is the same outside dimension as the outside dimension of the dielectric and therefore at this point the surface 12 forms a continuation of the outer cylindrical surface of the dielectric coating 3. There is therefore, at this portion of the electrode, a tapering area 13 of silver plating that overlies and seals the tapered portion 8 of the dielectric which prevents the dielectric from lifting away from the surface of the tube 2 during use as hydrogen gas is evolved from the conductive working surface 14, FIG. 3.

Beyond the cylindrical portion 12 of the electro-plated silver at the end of the tube 2, the outer surface 14 of the silver coating extends generally in parallel relation to the end surface 6 of the tube 2 thereby leaving electro-plated metallic material that is in general about .0005 inch in thickness. Adjacent the inner wall surface of the tube 2 the surface of the electro-plated material has a substantially steeper curve or chamfer as at 15 and terminates at a point 16 coincident with the intersection of the surface 7 with the inner wall of the tube 2. Accordingly any of the electro-plated material 9 formed on the inner wall surface of the tube 2 is removed so that no restriction to the flow of electrolyte through the tube is created.

This electrode is used in the drilling of small diameter holes and may be used in any of the well-known machines that perform such an electro-chemical drilling function.

I claim:
1. A hollow electrode for use in electro-chemical drilling including
    a small diameter metallic tube having a working end
    a thin dielectric coating on the outside surface of the tube, the coating and the outer surface being frustoconical adjacent to the working end to form a tapering feathered edge on the dielectric and
    an electroplated metallic coating on said frustoconical surface and overlying the feather edge of said dielectric.
2. An electrode as in claim 1 in which the conductive coating has an outer cylindrical working surface coextensive with the outer surface of the dielectric coating.
3. An electrode as in claim 1 in which the frustoconical surface blends into a surface forming the working end of the tube, said working surface terminating at the inner wall of the tube in a substantially radial surface.
4. An electrode as in claim 3 in which the working surface and the frustoconical surface are both covered with said conductive coating.
5. An electrode as in claim 1 in which the tube is about .010 inch in diameter, the dielectric coating is less than .001 inch thick and the conductive coating is thicker than the dielectric coating and also less than .001 inch.
6. In the manufacture of a hollow electrode for electrochemical drilling the steps of:
    providing a small diameter metallic tube of a diameter smaller than the hole to be drilled
    coating the outer surface of the tube with a thin dielectric
    tapering back the end of the tube and dielectric coating to form an oblique end surface on the dielectric and on the tube adjacent thereto
    electroplating a metal on said oblique end surface and on the remainder of the end of the tube and
    machining a finished working contour on said conductive surface.
7. The process of making a hollow electrode as in claim 6 in which the electrically conductive working surface is in part a cylindrical surface forming an extension of and coincident with the outer surface of the dielectric material.
8. The process of making a hollow electrode as in claim 6 in which the tube is on the order of .010 inch in diameter.
9. The process of making a hollow electrode as in claim 8 in which the dielectric coating is less than .001 inch thick.
10. The process of making a hollow electrode as in claim 7 in which the cylindrical working surface terminates in a shaped end surface that extends to the inner wall surface and terminates at that wall in a chamfer or curve having a relatively small radius.

References Cited

UNITED STATES PATENTS

| | | | |
|---|---|---|---|
| 3,285,844 | 11/1966 | Hallsworth et al. | 204—284 |
| 3,278,411 | 10/1966 | Williams | 204—284 X |
| 3,218,248 | 11/1965 | Williams | 204—284 |
| 3,536,599 | 10/1970 | Williams | 204—143 M |
| 3,547,798 | 12/1970 | Haggerty | 204—290 R |

JOHN H. MACK, Primary Examiner

R. J. FAY, Assistant Examiner

U.S. Cl. X.R.

204—143 M, 224, 290 R